(12) United States Patent
Wen

(10) Patent No.: US 10,284,686 B2
(45) Date of Patent: May 7, 2019

(54) SERVER, CLIENT, SYSTEM AND METHOD FOR PRELOADING BROWSED PAGE IN BROWSER

(71) Applicant: Beijing Qihoo Technology Company Limited, Beijing (CN)

(72) Inventor: Zhe Wen, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 194 days.

(21) Appl. No.: 14/761,257

(22) PCT Filed: Dec. 31, 2013

(86) PCT No.: PCT/CN2013/091221
§ 371 (c)(1),
(2) Date: Jul. 15, 2015

(87) PCT Pub. No.: WO2014/110978
PCT Pub. Date: Jul. 24, 2014

(65) Prior Publication Data
US 2015/0373150 A1 Dec. 24, 2015

(30) Foreign Application Priority Data
Jan. 18, 2013 (CN) .......................... 2013 1 0020279

(51) Int. Cl.
*H04L 29/06* (2006.01)
*G06F 17/30* (2006.01)
*H04L 29/08* (2006.01)

(52) U.S. Cl.
CPC ........ *H04L 67/42* (2013.01); *G06F 17/30902* (2013.01); *H04L 67/02* (2013.01); *H04L 67/2842* (2013.01); *H04L 67/2847* (2013.01)

(58) Field of Classification Search
CPC ....................................................... H04L 67/42
See application file for complete search history.

(56) References Cited

U.S. PATENT DOCUMENTS 6,182,122 B1 * 1/2001 Berstis .............. G06F 17/30902
707/E17.12
6,598,051 B1 * 7/2003 Wiener ............... G06F 17/3089
(Continued)

FOREIGN PATENT DOCUMENTS

| CN | 1194413 | 9/1998 |
|---|---|---|
| CN | 101042695 | 9/2007 |

(Continued)

*Primary Examiner* — Esther B. Henderson
(74) *Attorney, Agent, or Firm* — LKGlobal | Lorenz & Kopf, LLP

(57) ABSTRACT

The present invention relates to the technical field of network data communication, and discloses a server, a client, a system and a method for preloading a browsed page in a browser. The server includes: a link extraction module configured to extract, from a currently browsed page on a client, links included in the page; a page downloading module configured to download pages corresponding to the links from websites; a page compression module configured to compress the downloaded pages to generate page compression packages corresponding to the links and store the page compression packages into a storage module; the storage module configured to store the page compression packages corresponding to the links; a communication transceiving module configured to receive a request transmitted by the client for loading a page of a link in the page currently browsed and transmit the page compression package corresponding to the link to be loaded to the client. The present invention can solve the technical problems of resulting in a lot of useless download traffic in the client, wasting the network traffic and increasing the operation load of the client.

14 Claims, 10 Drawing Sheets

---

Extracting, from currently browsed page on a client, links included in the page — S1010

Downloading pages corresponding to the extracted links from websites, compressing the downloaded pages to generate page compression packages corresponding to the links and storing the page compression packages — S1020

After receiving a request transmitted by the client for loading a page of a link in the currently browsed page, transmitting the page compression package corresponding to the link to be loaded to the client — S1030

(56) References Cited

U.S. PATENT DOCUMENTS

| | | | | |
|---|---|---|---|---|
| 6,606,645 | B1 * | 8/2003 | Cohen | H04L 29/06 |
| | | | | 709/203 |
| 7,260,583 | B2 * | 8/2007 | Wiener | G06F 17/3061 |
| 2002/0165925 | A1 * | 11/2002 | Hamilton, II | G06F 17/30902 |
| | | | | 709/213 |
| 2011/0047243 | A1 | 2/2011 | Ramadas | |

FOREIGN PATENT DOCUMENTS

| | | |
|---|---|---|
| CN | 102663012 | 9/2012 |
| CN | 103118081 | 5/2013 |

* cited by examiner

Navigation

Sci-Tech>IT> Internet> International

Last update: 2012-10-28 15:53

· Baidu shares rise next week for four reasons
· Amazon says KindleFire creats a new record
· Cell phone lost in bar and Nexus photos out
· Analysts say Google should be more worried
  about Microsoft rather than Apple
· Annual weakest password exposed: Password
· Gao Peng eligible for $ 40 million investment
· South Korea for the restoration of Dokdo English name
· Google search is pulled down from altar
· Facebook Executives do not sell unlocked stock
· Archive collects more than 10 petabytes
· Google App Engine suffered downtime
· Google tests "day delivery" service
· Citigroup fined $ 2 million because of FB IPO
· Who killed the American "Newsweek"?

[1/265] Next Page
To [____] Page Jump

Sci-Tech > IT > Internet > International

Hot News

·Yahoo homepage wears new clothes or uses a new logo
·Expedia Q3 revenue increased by 18%

Login | Register

Homepage> Sci-Tech>IT> Internet > Internation > Text

Top-up and paying using Surfing Browser
with less traffic
Analysts say Google should be more worried
about Microsoft rather than Apple
2012-10-28 08:18 Sohu IT

[Sohu IT news] Beijing October 27,
according to foreign media reports, insiders
pointed out that Google should be more
worried about Microsoft rather than more
Apple in the Tablet PC and enterprise market.
． ． ． ． ． ．
I have tried the Dell Latitude 10 Business
Tablet PC, and like it. From the heart to say
I'm a Google fan, but why I like Windows
Tablet PC? Because it was too pragmatic, not
only with beautiful user interface, but also
excellent performance. In fact, Latitude 10
are perfectly comparable with the iPad or
Nexus 7 in experience and graphics. It can
run any Windows software I need, and become
a complete Windows PC when attached to the
base, and can be put into the backpack, so
that 10 Latitude is far better than iPad in
practicality. Latitude 10 can solve issues
about writing and painting on Tablet PC when
coupled with Wacom Pen,
． ． ． ． ． ． ． ．

Of course, regardless of what kind of
platform the users choose, Google has enviable
search and browser business, and as long as the
users use Google's search services and Chrone
browser, Google will be able to publish
advertisements, and obtains advertising
revenue. However, after the advent of
Windows 8 Tablet PC, Google need to
strengthen the position of Android Tablet
PC in the enterprise market.

Fig. 7

SERVER, CLIENT, SYSTEM AND METHOD FOR PRELOADING BROWSED PAGE IN BROWSER

FIELD OF THE INVENTION

The present disclosure relates to the technical field of network data communication, in particularly, to a server, a client, a system and a method for preloading a browsed page in a browser.

BACKGROUND OF THE INVENTION

In the prior art, according to links in a browsed page of a browser, a browsing behavior of a user thereafter is predicted. All links in the page which may be clicked thereafter will be pre-downloaded. The loading speed of the page in the browser is enhanced in a way of pre-downloading pages corresponding to these links. However, most links in the page will not be clicked in the browsing thereafter. Therefore, though the speed of browsing the page can be enhanced by using the prior art, a lot of useless download traffic is generated in the client, which wastes network traffic and also increases an operation load of the client.

SUMMARY OF THE INVENTION

In view of the above described problem, the present disclosure is proposed in order to provide a server, a client, a system and a method for preloading a browsed page in a browser for overcoming the above described problem or at least partly solving the above described problem.

According to one aspect of the present disclosure, there is provided a server for preloading a browsed page in a browser, the server comprising:
a link extraction module configured to extract, from a currently browsed page on a client, links included in the page;
a page downloading module configured to download pages corresponding to the links from websites;
a page compression module configured to compress the downloaded pages to generate page compression packages corresponding to the links and store the page compression packages into a storage module;
the storage module configured to store the page compression packages corresponding to the links;
a communication transceiving module configured to receive a request transmitted by the client for loading a page of a link in the page currently browsed and transmit the page compression package corresponding to the link to be loaded to the client.

According to another aspect of the present disclosure, there is provided a client for preloading a browsed page in a browser, the client comprising:
a request transmission module configured to, after receiving an instruction to load a page of a link in the currently browsed page, transmit a request for loading the page of the link in the currently browsed page to a server;
a page loading module configured to receive a page compression package corresponding to the link in the instruction transmitted by the server, instruct a decompression module to decompress the page compression package and load the page in the page compression package;
the decompression module configured to decompress the page compression package.

According to an aspect of the present disclosure, there is provided a system for preloading a browsed page in a browser, the system comprising:
aforesaid server and aforesaid client.

According to another aspect of the present disclosure, there is provided a method for preloading a browsed page in a browser, the method comprising:
extracting, from a currently browsed page on a client, links included in the page;
downloading pages corresponding to the links from websites, compressing the downloaded pages to generate page compression packages corresponding to the links and storing the page compression packages;
after receiving a request transmitted by the client for loading a page of a link in the page currently browsed, transmitting the page compression package corresponding to the link to be loaded to the client.

According to still another aspect of the present disclosure, there is provided a computer program including computer readable codes, when the computer readable codes run on a server, the server is caused to execute the method for preloading a browsed page in a browser described in any of above items.

According to yet another aspect of the present disclosure, there is provided a computer readable medium in which the computer program described in the above item is stored.

According to the technical solution of the present disclosure, links included in a currently browsed page on a client can be extracted from the page, pages corresponding to the links can be downloaded from websites, compression process can be performed for the downloaded pages to generate page compression packages corresponding to the links and the page compression packages are stored, and after receiving a request transmitted by the client for loading a page of the a link in the page currently browsed, the page compression package corresponding to the link to be loaded can be transmitted to the client.

By using the technical solution in the present disclosure, the pages corresponding to the links in a page browsed on the client will be downloaded and saved together, and the pages will be compressed into compression packages. When a need to download actually occurs in the client because of the clicking of the link, etc., the corresponding compression package will be issued to the client. Thus, the problems of causing a lot of useless download traffic in the client, wasting the network traffic and increasing the operation load of the client are solved, and the beneficial effects of not only being capable of enhancing a browsing speed in the client, but also being capable of saving the network traffic of the client and decreasing the operation load of the client are obtained.

The above explanation is merely an outline of the technical solution of the present disclosure. In order to be able to understand the technical means of the present disclosure more clearly and to be able to implement it according to the contents of the specification, and in order to enable the above and other objects, features and advantages of the present disclosure more evident and comprehensible, the specific embodiments of the present disclosure are particularly described in the following.

BRIEF DESCRIPTION OF DRAWINGS

By reading the following detailed description of the preferred embodiments, various other advantage and benefits will be clear for those ordinary skilled in the art. The drawings are merely used for purpose of illustration of the preferred embodiments and are not considered as limit of the present disclosure. Further, the same components will be denoted by the same reference symbol throughout the drawings. In the drawings:

FIG. 4 schematically shows a schematic diagram of a page updated after a client link clicked according to one embodiment of the present disclosure;

FIG. 6 schematically shows a schematic diagram of three relevant web pages pre-browsed on the client according to one embodiment of the present disclosure;

FIG. 7 schematically shows a schematic diagram of a full page after a text addition is completed in the client according to one embodiment of the present disclosure;

DETAILED DESCRIPTION OF THE INVENTION

Below, the present disclosure will be further described in connection with the drawings and the specific embodiments.

Figure 1:
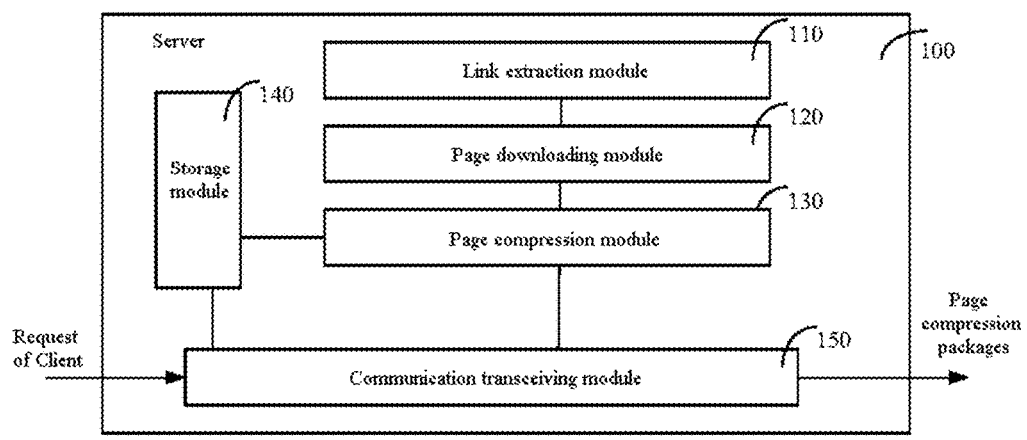
FIG. 1 schematically shows a diagram of a structure of a server for preloading a browsed page in a browser according to one embodiment of the present disclosure.

Referring to FIG. 1, a diagram of a structure of a server for preloading a browsed page in a browser according to one embodiment of the present disclosure is schematically shown. The server 100 includes a link extraction module 110, a page downloading module 120, a page compression module 130, a storage module 140 and a communication transceiving module 150.

The link extraction module 110 is configured to extract, from a currently browsed page on a client 200, links included in the page.

The page downloading module 120 is configured to download pages corresponding to the links from websites.

The page compression module 130 is configured to compress the downloaded pages to generate page compression packages corresponding to the links and store the page compression packages into the storage module 140.

The storage module 140 is configured to store the page compression packages corresponding to the links.

The communication transceiving module 150 is configured to receive a request transmitted by the client 200 for loading a page of a link in the page currently browsed and transmit the page compression package corresponding to the link to be loaded to the client 200.

Figure 2:
FIG. 2 schematically shows a schematic diagram of a page which is browsed currently on a client according to one embodiment of the present disclosure.

Referring to FIG. 2, a schematic diagram of a page which is browsed currently on a client according to one embodiment of the present disclosure is schematically shown. The present disclosure will be exemplified by taking the page shown in FIG. 2 as an example.

In the page included are links of "Login", "Register", "Homepage", "Sci-Tech", "IT", "Internet", "International", "Previous Page", etc. The link extraction module 110 extracts the links included in the page. Since the client 200 obtains the browsed page from the server 100, the server 100 is capable of knowing the currently browsed page on the client 200. The page downloading module 120 downloads the pages corresponding to the respective links from the respective websites. The page compression module 130 compresses the downloaded pages to generate page compression packages corresponding to the links and stores the page compression packages into the storage module 140. The storage module 140 can be the memory of the server 100 in which the page compression packages corresponding to the links are stored. After a certain link in the page is clicked, the client 200 will transmit a request for loading the page of the clicked link. The communication transceiving module 150 receives the request transmitted by the client 200 and transmits the page compression package corresponding to the link in the request to the client 200. Thus, the client 200 obtains the page compression package corresponding to the clicked link and the page is displayed on the client 200 after the compression package is decompressed.

The server in the present disclosure can be a cloud server which downloads and saves the pages corresponding to the links in various pages browsed by clients together, and compresses the pages into compression packages. When a need to download actually occurs in a client because of the clicking of the link, etc., the corresponding compression package will be issued to the client. Thus, the problems of resulting in a lot of useless download traffic in the client, wasting the network traffic and increasing the operation load of the client are solved, and the beneficial effects of not only being capable of accelerating a browsing speed in the client, but also being capable of saving the network traffic of the client and decreasing the operation load of the client are obtained.

Figure 3:
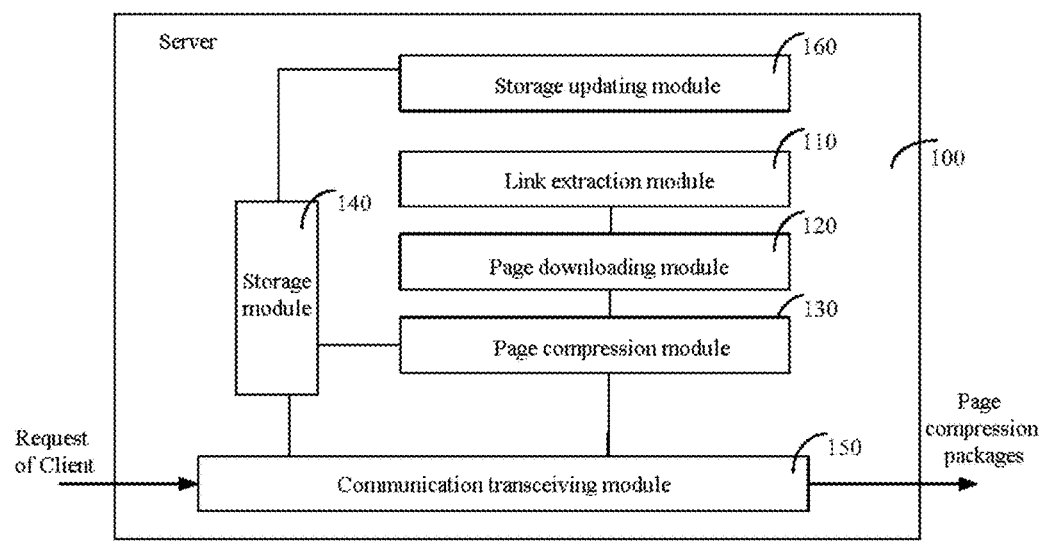
FIG. 3 schematically shows a diagram of a structure of a server for preloading a browsed page in a browser according to one embodiment of the present disclosure.

FIG. 3 schematically shows a diagram of a structure of a server for preloading a browsed page in a browser according to one embodiment of the present disclosure. In addition to the link extraction module 110, the page downloading module 120, the page compression module 130, the storage module 140 and the communication transceiving module 150 described above, the server 100 further includes a storage updating module 160.

The storage updating module 160 is configured to take the page in the page compression package transmitted to the client 200 as the currently browsed page on the client 200, compare the links included in the currently browsed page to the links corresponding to the stored page compression packages and update the page compression packages stored in the storage module 140 according to the comparison result.

Further, the storage updating module 160 is configured to, for a link which is not included in the currently browsed page, delete the page compression package corresponding to the link from the storage module 140; for a link which is included in the currently browsed page and of which the corresponding page compression package is not stored, download the page corresponding to the link from the website, compress the downloaded page to generate a page compression package corresponding to the link and store the page compression package into the storage module 140.

Referring to FIG. 4, a page updated after a client link click according to one embodiment of the present disclosure is schematically shown. The example of the page shown in FIG. 4 which is updated after the link of "International" in FIG. 2 is clicked on the client link is exemplarily explained. In the page included are the links of "Login", "Register", "Homepage", "Sci-Tech", "IT", "Internet", "International" and the links of the news items such as "Four reasons why the price of the Baidu share will rise next week", "Amazon said Kindlefire creates a record", etc.

The storage updating module 160 compares the links included in the page to the links corresponding to the stored page compression packages. Wherein, the "Login", "Register", "Homepage", "Sci-Tech", "IT", "Internet", "International" are included in the updated page and the page compression packages corresponding to these links are already stored. Therefore, the page compression packages corresponding to these links are still stored and not changed. The link of "Previous Page" is not included in the updated page and therefore the page compression package corresponding to the "Previous Page" is deleted from the storage module 140. The page compression packages corresponding to the the links of the news items included in the updated page are not stored in the storage module 140, so the pages corresponding to the links of the news items are downloaded from the websites, the compression process is performed for the downloaded pages to generate page compression packages corresponding to the links and the page compression packages are stored into the storage module 140.

As can be seen from the above, by correspondingly updating the stored page compression packages corresponding to the links when the page that is browsed on the client is changed, useful page compression packages in the stored page compression packages are remained and only the page compression packages corresponding to the links which are newly added in the changed page are added, the network traffic of the server side and the operation load of the server performing compression of the pages thus can be further decreased.

Figure 5:
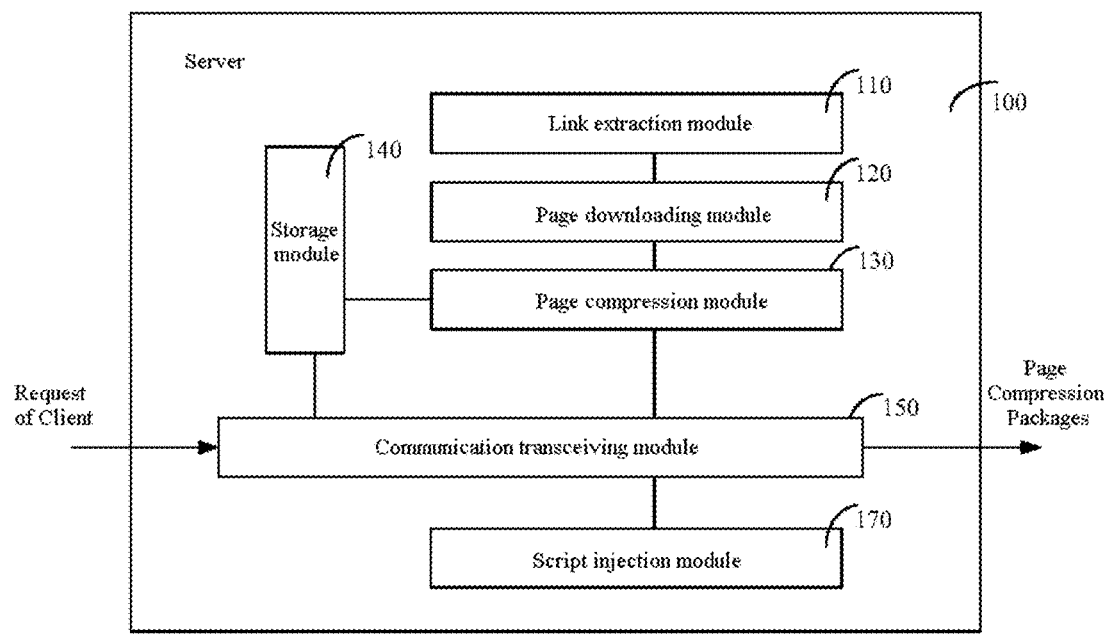
FIG. 5 schematically shows a diagram of a structure of a server for preloading a browsed page in a browser according to one embodiment of the present disclosure.

FIG. 5 schematically shows a diagram of a structure of a server for preloading a browsed page in a browser according to one embodiment of the present disclosure. In addition to the link extraction module 110, the page downloading module 120, the page compression module 130, the storage module 140 and the communication transceiving module 150 described above, the server 100 further includes a script injection module 170. Of course, the server 100 in the present embodiment can also further include the previously described storage updating module 160. Here, exemplary explanation is performed only according to what is shown in FIG. 5.

The script injection module 170 is configured to, after receiving the request transmitted by the client 200 for loading an original page, inject a text loading script into the original page transmitted to the client 200. The original page is a page browsed when a website is accessed initially.

The page compression module 130 is further configured to, for a link corresponding to a keyword in the page currently browsed on the client 200, extract the text in the page corresponding to the link, compress the extracted text to generate a page compression package corresponding to the link which only includes the text.

Wherein, the keyword is used for representing an interrelation of the texts between the pages. For example, the keyword can be "Previous Page", "Next Page", "The X-th Page", etc.

The communication transceiving module 150 is further configured to receive the request transmitted by the client 200 for loading the page of the link corresponding to the keyword, transmit the page compression package corresponding to the link to the client 200 to make the client 200 add the text in the page compression package into the text of the currently browsed page via the text loading script.

In the present embodiment, for the link corresponding to the keyword, when generating the page compression package, the text in the page corresponding to the link is extracted, only the text in the page corresponding to the link is compressed to generate a compression package, thus the network traffic can be further decreased.

Figure 6:
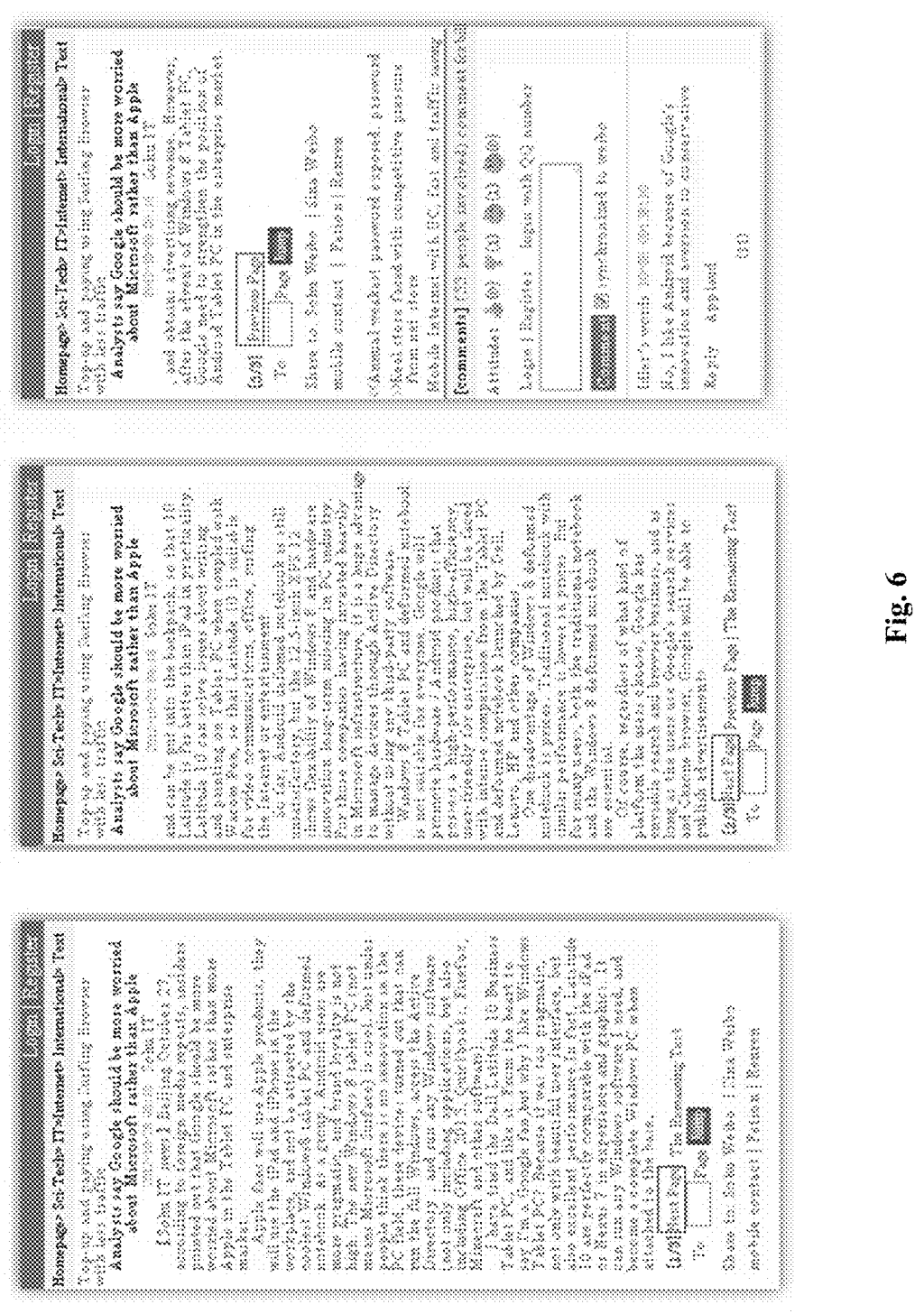

FIG. 6 schematically shows a schematic diagram of three relevant web pages pre browsed by the client according to one embodiment of the present disclosure. The three web pages in FIG. 6 are the first page, the second page and the third page of an article and the contents of the text in the three pages are combined into a complete article. Parts surrounded by blocks in FIG. 6 are keywords.

Firstly, after receiving the request transmitted by the client 200 for loading an original page, i.e. the first page, the script injection module 170 injects the text loading script into the original page transmitted to the client 200. The client 200 can add the text in the received page compression package into the text of the currently browsed page via the text loading script.

The page compression module 130, for a link corresponding to a keyword of "Next Page" in the first page currently browsed on the client 200, extracts the text in the page corresponding to the link, i.e. the second page. Specifically, the page compression module 130 finds out that there is a "Text" in the third <div> tag pair <div class=" w1 Text"> . . . </div> by inquiring in the html of the second page, so it is determined that the text is included in the third <div> tag pair and the text is extracted. Subsequently, the page compression module 130 compresses the extracted text to generate the page compression package corresponding to the link which only includes the text.

After the browsing of the first page is completed, the page is slid downwards, and the client 200 receives an instruction to load the page of the link corresponding to the keyword "Next Page" in the currently browsed page and transmits the request for loading the page of the link corresponding to the keyword "Next Page". The communication transceiving module 150 receives the request and transmits the page compression package corresponding to the link "Next Page", i.e. the second page to the client 200. The client 200 adds the text in the page compression package into the text of the currently browsed page via the text loading script. And after receiving the text of the second page, the client 200 automatically adds 1 to the page number in the link corresponding to the "Next Page", so that the "Next Page" corresponds to the third page. After the browsing of the second page is completed, the page is slid downwards, and the client 200 obtains the text of the third page from the server 100 and adds the text in the third page into the text of the currently browsed page via the text loading script. A full page after the text addition is completed in the client 200 is shown in FIG. 7.

Further, the script injection module 170 is also configured to inject a memory release script into the original page transmitted to the client 200, so that after receiving the instruction to load the link corresponding to the keyword, the client 200 judges whether the memory occupied by the currently browsed page exceeds a preset threshold value, if it does, releases the memory occupied by the text in the previously browsed page.

For example, the contents in the memory release script are:

parent.removeChild(e);

e=null;

delete e

After the browsing of the second page is completed, the page is slid downwards, and the client 200 receives an instruction to load the page of the link corresponding to the keyword "Next Page". The client 200 judges whether the memory occupied by the currently browsed page exceeds a preset threshold value, if it does, releases the memory occupied by the text in the first page and/or the second page.

As can be seen from the above, by injecting the memory release script into the original page transmitted to the client, the problem of resulting in the memory overflow due to the excessive text added is solved, and the beneficial effect of preventing the memory overflow is obtained.

Further, the script injection module 170 is also configured to inject a reading tag function script and/or a page selection function script into the original page transmitted to the client 200, so as to add a reading tag function key and/or a selection page function key in the currently browsed page.

Here, by the way of injecting a function script into the original page, a function key can be added in the page of the client 200, thus the beneficial effect of expanding the functions in the page is achieved.

Figure 8:
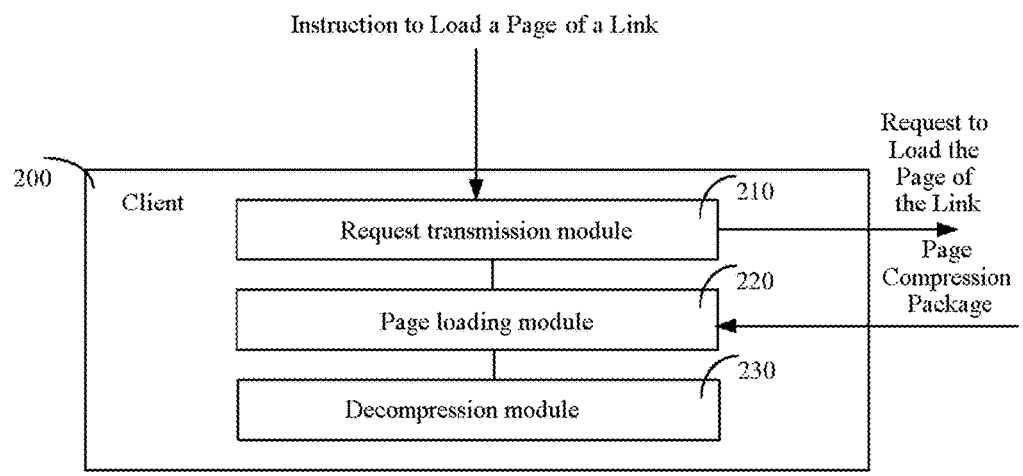
FIG. 8 schematically shows a diagram of a structure of a client for preloading a browsed page in a browser according to one embodiment of the present disclosure.

Referring to FIG. 8, a diagram of a structure of the client 200 for preloading a browsed page in a browser according to one embodiment of the present disclosure is schematically shown. The client 200 includes a request transmission module 210, a page loading module 220 and a decompression module 230.

The request transmission module 210 is configured to, after receiving an instruction to load a page of a link in the currently browsed page, transmit a request for loading the page of the link in the currently browsed page to a server 100.

The page loading module 220 is configured to receive the page compression package corresponding to the link in the instruction transmitted by the server 100, instruct the decompression module 230 to decompress the page compression package and load the page in the page compression package.

The decompression module 230 is configured to decompress the page compression package.

In the present disclosure, the client receives only the page compression package corresponding to the link to be browsed and the pages of all the links in the page are not needed to be downloaded in advance. On the other hand, the page compression packages are already generated in advance at the server side, and by downloading the page compression packages from the server side, the browsing speed can be enhanced. Therefore, the present disclosure obtains the beneficial effects of not only being capable of accelerating the browsing speed in the client, but also being capable of saving the network traffic of the client and decreasing the operation load of the client.

Further, the request transmission module 210 is also configured to, after receiving an instruction to load an original web page, transmit a request for loading the original page to the server 100. The original page is a page browsed when a website is accessed initially.

The page loading module 220 is also configured to receive the original page transmitted by the server 100 with the injected text loading script, and load the original page; after receiving the page compression package of the link corresponding to a keyword transmitted by the server 100, add the text in the page compression package into the text of the currently browsed page via the text loading script. The keyword is used to represent the interrelation of the texts between the pages.

By performing the injection of the text loading script into the original page, the text in the page compression package is added into the text of the currently browsed page. Therefore, in the case of only receiving the text, page presentation also can be achieved, which further reduces the network traffic used for browsing the web page on the client 200.

Further, the memory release script is also injected in the original page.

The page loading module 220 is also configured to, after receiving the instruction to load the link corresponding to the keyword, judge via the memory release script whether the memory occupied by the currently browsed page exceeds a preset threshold value, if it does, release the memory occupied by the text in the previously browsed page.

By performing the injection of the memory release script into the original page, the problem of resulting in the memory overflow due to the excessive text added is solved, and the beneficial effect of preventing the memory overflow is obtained.

Further, a reading tag function script and/or a page selection function script is also injected in the original page.

The page loading module 220 is also configured to, after receiving the original page transmitted by the server 100, add a reading tag function key and/or a selection page function key in the currently browsed page via the reading tag function script and/or the page selection function script.

By the way of injecting a function script into the original page, a function key can be added in the page of the client, thus the beneficial effect of expanding the functions in the page is achieved.

Figure 9:
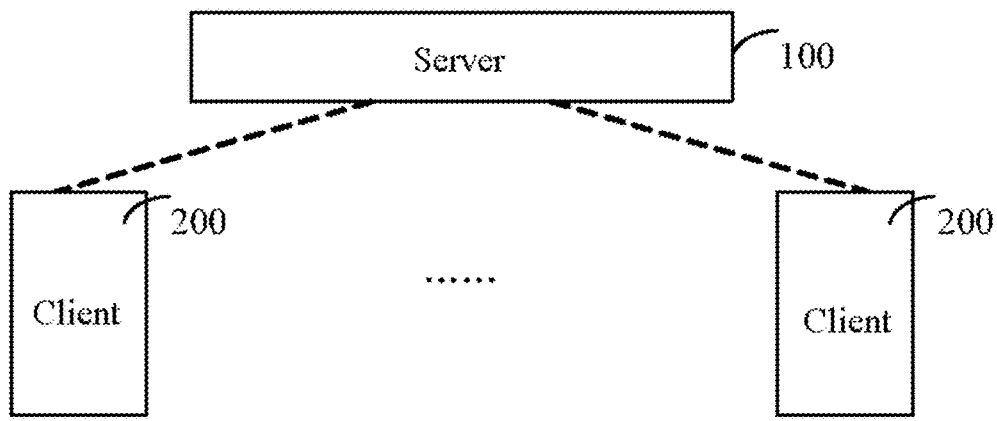
FIG. 9 schematically shows a diagram of a structure of a system for preloading a browsed page in a browser according to one embodiment of the present disclosure.

Referring to FIG. 9, a diagram of a structure of a system for preloading a browsed page in a browser according to one embodiment of the present disclosure is schematically shown. The system includes the server 100 previously described and a plurality of clients 200 previously described. The server 100 and the clients 200 can be connected directly or can be connected through the network, and there is no particular limitation here.

Figure 10:
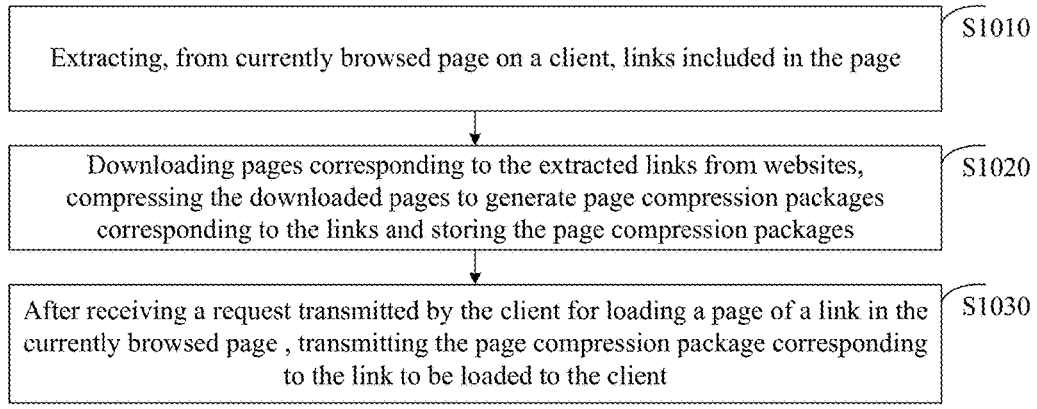
FIG. 10 schematically shows a flowchart of a method for preloading a browsed page in a browser according to one embodiment of the present disclosure.

Referring to FIG. 10, a flowchart of a method for preloading a browsed page in a browser according to one embodiment of the present disclosure is schematically shown. The method includes the following steps.

A step S1010: extracting, from a currently browsed page on a client, links included in the page.

A step S1020: downloading pages corresponding to the extracted links from websites, compressing the downloaded pages to generate page compression packages corresponding to the links and storing the page compression packages.

A step S1030: after receiving a request transmitted by the client for loading a page of a link in the currently browsed page, transmitting the page compression package corresponding to the link to be loaded to the client.

The present disclosure will be exemplified by taking the page shown in FIG. 2 as an example.

In the page included are links of "Login", "Register", "Homepage", "Sci-Tech", "IT", "Internet", "International", "Previous Page", etc. In the step S1010, the links included in the page are extracted. In the step S1020, the pages corresponding to the respective links are downloaded from the respective websites, compression process is performed for the downloaded pages to generate page compression packages corresponding to the links and the page compression packages are stored. After a certain link in the page is clicked, the client will transmit the request for loading the page of the clicked link. In the step S1030, the request transmitted by the client is received and the page compression package corresponding to the link in the request is transmitted to the client. Thus, the client obtains the page compression package corresponding to the clicked link and the page is displayed on the client after the compression package is decompressed.

In the present disclosure, the pages corresponding to the links in pages browsed by the respective clients will be downloaded and saved together, and the pages will be compressed into compression packages. When a need to download actually occurs in a client because of the clicking of the link, etc., the corresponding compression package will be issued to the client. Thus, the problems of resulting in a lot of useless download traffic in the client, wasting the network traffic and increasing the operation load of the client are solved, and the beneficial effects of not only being capable of accelerating a browsing speed in the client, but also being capable of saving the network traffic of the client and decreasing the operation load of the client are obtained.

In an embodiment, the method in the present disclosure further includes the following step.

Taking the page in the page compression package transmitted to the client as the currently browsed page on the client, comparing the links included in the currently browsed page to the links corresponding to the stored page compression packages and updating the stored page compression packages according to the comparison result.

Further, the updating the stored page compression packages according to the comparison result includes the following steps.

For a link which is not included in the currently browsed page, deleting the page compression package corresponding to the link.

For a link which is included in the currently browsed page and of which the corresponding page compression package is not stored, downloading the page corresponding to the link from the website, compressing the downloaded page to generate a page compression package corresponding to the link and storing the page compression package.

The example of the page shown in FIG. 4 which is updated after the link of "International" in FIG. 2 is clicked on the client link is exemplarily explained. In the page included are the links of "Login", "Register", "Homepage", "Sci-Tech", "IT", "Internet", "International" and the links of the news items such as "Four reasons why the price of the Baidu share will rise next week", "Amazon said Kindlefire creates a record", etc.

The links included in the page are compared to the links corresponding to the stored page compression packages. Wherein, the "Login", "Register", "Homepage", "Sci-Tech", "IT", "Internet", "International" are included in the updated page and the page compression packages corresponding to these links are already stored. Therefore, the page compression packages corresponding to these links are still stored and not changed. The link of "Previous Page" is not included in the updated page and therefore the page compression package corresponding to the "Previous Page" is deleted. The page compression packages corresponding to the the links of the news items included in the updated page are not stored, so the pages corresponding to the links of the news items are downloaded from the websites, the compression process is performed for the downloaded pages to generate page compression packages corresponding to the links and the page compression packages are stored.

As can be seen from the above, by correspondingly updating the stored page compression packages corresponding to the links when the page that is browsed on the client is changed, useful page compression packages in the stored page compression packages are remained and only the page compression packages corresponding to the links which are newly added in the changed page are added, the network traffic used for downloading the pages and the operation load for performing compression of the pages thus can be further decreased.

Figure 11:
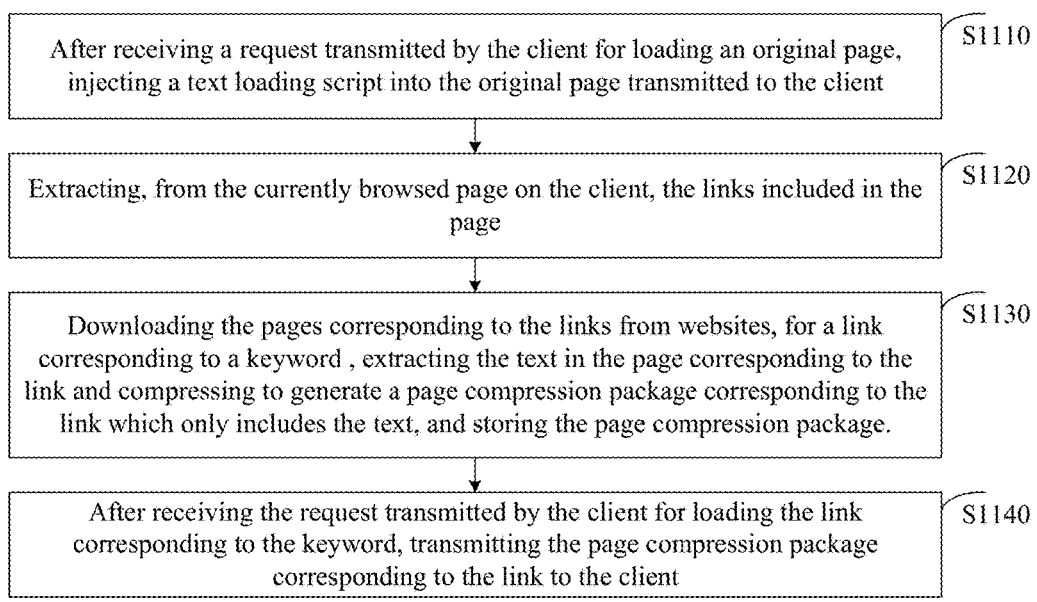
FIG. 11 schematically shows a flowchart of a method for preloading a browsed page in a browser according to one embodiment of the present disclosure.

Referring to FIG. 11, a flowchart of a method for pre-loading a browsed page in a browser according to one embodiment of the present disclosure is schematically shown. The method includes the following steps.

A step S1110: after receiving a request transmitted by the client for loading an original page, injecting a text loading script into the original page transmitted to the client. The original page is a page browsed when a website is accessed initially.

A step S1120: extracting, from the currently browsed page on the client, the links included in the page.

A step S1130: downloading the pages corresponding to the extracted links from websites, for a link corresponding to a keyword in the currently browsed page on the client, extracting the text in the page corresponding to the link and compressing to generate a page compression package corresponding to the link which only includes the text, and storing the page compression package.

The keyword is used for representing an interrelation of the texts between the pages.

A step S1140: after receiving the request transmitted by the client for loading the link corresponding to the keyword, transmitting the page compression package corresponding to the link to the client and making the client to add the text in the page compression package into the text of the currently browsed page via the text loading script.

In the present embodiment, for the link corresponding to the keyword, when generating the page compression package, the text in the page corresponding to the link is extracted, only the text in the page corresponding to the link is compressed to generate a compression package, thus the network traffic can be further decreased.

By taking three relevant web pages pre-browsed by the client shown in FIG. 6 as an example, exemplary explanation will be performed. The three web pages in FIG. 6 are the first page, the second page and the third page of an article and the contents of the text in the three pages are combined into a complete article. Parts surrounded by blocks in FIG. 6 are keywords.

Firstly, after receiving the request transmitted by the client for loading the original page, i.e. the first page, the text loading script is injected into the original page transmitted to the client. The client can add the text in the received page compression package into the text of the currently browsed page via the text loading script.

For a link corresponding to a keyword of "Next Page" in the first page currently browsed on the client, the text in the page corresponding to the link, i.e. the second page is extracted. Specifically, it is found out that there is a "Text"

in the third <div> tag pair <div class=" w1 Text">...</div> by inquiring in the html of the second page, so it is determined that the text is included in the third <div> tag pair and the text is extracted. Subsequently, compression process is performed for the extracted text to generate the page compression package corresponding to the link which only includes the text.

After the browsing of the first page is completed, the page is slid downwards, and the client receives an instruction to load the page of the link corresponding to the keyword "Next Page" in the currently browsed page and transmits the request for loading the page of the link corresponding to the keyword "Next Page". After receiving the request, the page compression package corresponding to the link "Next Page", i.e. the second page is transmitted to the client. The client adds the text in the page compression package into the text of the currently browsed page via the text loading script. And after receiving the text of the second page, the client automatically adds 1 to the page number in the link corresponding to the "Next Page", so that the "Next Page" corresponds to the third page. After the browsing of the second page is completed, the page is slid downwards, and by the method in the present embodiment as well, the client obtains the text in the third page and adds the text in the third page into the text of the currently browsed page via the text loading script. A full page after the text addition is completed in the client is shown in FIG. 7.

Further, the method in the present disclosure also includes: injecting a memory release script into the original page transmitted to the client, so that after receiving the instruction to load the link corresponding to the keyword, the client judges whether the memory occupied by the currently browsed page exceeds a preset threshold value, if it does, release the memory occupied by the text in the previously browsed page.

For example, the contents in the memory release script are:
parent.removeChild(e);
  e=null;
  delete e After the browsing of the second page is completed, the page is slid downwards, and the client receives an instruction to load the page of the link corresponding to the keyword "Next Page". The client judges whether the memory occupied by the currently browsed page exceeds a preset threshold value, if it does, release the memory occupied by the text in the first page and/or the second page.

As can be seen from the above, by injecting the memory release script into the original page transmitted to the client, the problem of resulting in the memory overflow due to the excessive text added is solved, and the beneficial effect of preventing the memory overflow is obtained.

Further, the method in the present disclosure also includes: injecting a reading tag function script and/or a page selection function script into the original page transmitted to the client, so as to add a reading tag function key and/or a selection page function key in the currently browsed page.

Here, by the way of injecting a function script into the original page, a function key can be added in the page of the client, thus the beneficial effect of expanding the functions in the page is achieved.

The respective components of the embodiments of the present disclosure can be implemented in hardware, or implemented in a software module running on one or more processor, or implemented in combination thereof. It should be understood by those skilled in the art, that in practice a microprocessor or a digital signal processor (DSP) can be used to implement some or all functions of some or all components in the server, the client and the system for preloading a browsed page in a browser according to the embodiments of the present disclosure. The present disclosure can also be implemented as a device or apparatus program (e.g., a computer program and a computer program product) for executing some of all of the method described here. Such a program for implementing the present disclosure can be stored on a computer readable medium or can have a form of one or more signal. Such a signal can be downloaded from an Internet website or provided on a carrier signal or provided in any other form.

Figure 12:
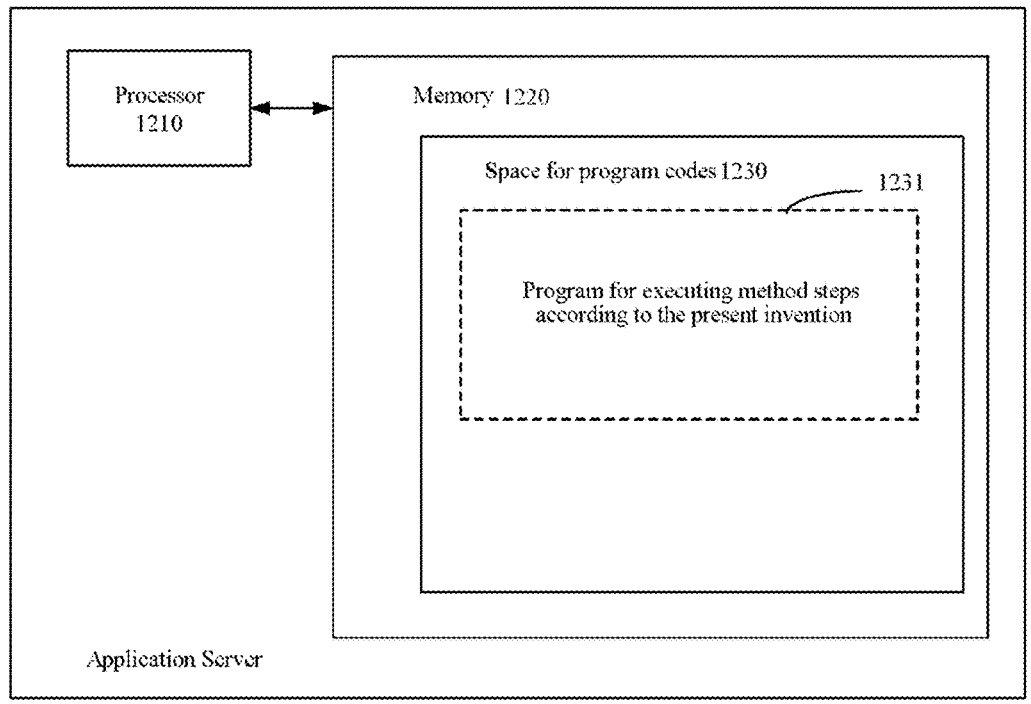
FIG. 12 schematically shows a block diagram of a server for executing the method according to the present disclosure.
Figure 13:
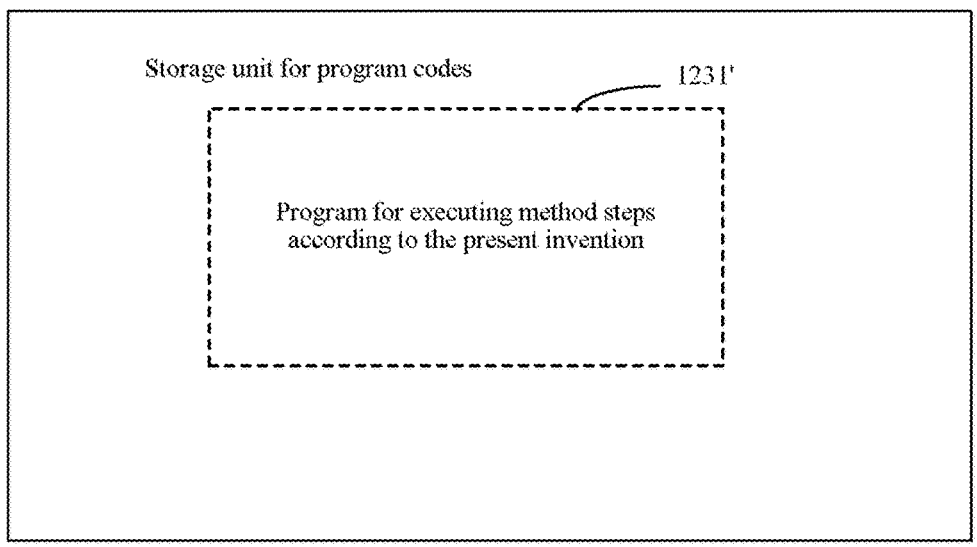
FIG. 13 schematically shows a storage unit for holding or carrying a program codes for implementing the method according to the present disclosure.

For example, FIG. 12 shows a server, such as an application server, in which the method for preloading a browsed page in a browser according to the present disclosure can be implemented. The server traditionally includes a processor 1210 and a computer program product or a computer readable medium in a form of a memory 1220. The memory 1220 can be an electronic memory such as a flash memory, an EEPROM (Electrically Erasable Programmable Read Only Memory), an EPROM, a hard disk or a ROM or the like. The memory 1220 has a storage space 1230 for program codes 1231 for executing any method steps in the above method. For example, the storage space 1230 for the program codes can include the respective program codes 1231 for respectively implementing various steps in the above method. These program codes can be read out from or written into one or more computer program products. These computer program products include program code carriers such as a hard disk, a compact disk (CD), a memory card or a floppy disk. Such computer program products are generally portable or fixed storage units as described with reference to FIG. 13. The storage units can have storage sections, storage spaces, etc. arranged similar to those of the memory 1220 in the server of FIG. 12. The program codes can be compressed for example in a suitable format. Generally, the storage units include computer readable codes 1231', that is, codes that can be read by a processor for example such as 1210. When these codes are run by the server, the server is caused to execute respective steps in the above described method.

"One embodiment", "an embodiment" or "one or more embodiment" referred to as in the specification means that a specific feature, structure or characteristic described in connection with the embodiments is included in at least one embodiment of the present disclosure. Moreover, it should be noted that, the expression example of "in one embodiment" here does not necessarily all refer to the same embodiment.

In the specification provided here, a number of specific details are explained. However, it should be understood that, the embodiments of the present disclosure can be practiced without these specific details. In some embodiments, a method, structure and technology known well have not been illustrated in detail, so as not to obscure the understanding of the specification.

It should be noted that, the above described embodiments are used for explaining the present disclosure, rather than limiting the present disclosure, and an alternative embodiment can be designed by those skilled in the art without departing from the scope of the appended claims. In the claims, any reference symbol positioned between parentheses should not be considered the limiting of the claims. The word "include" does not exclude the existence of a element or a step that is not described in the claims. The word "a" or "an" positioned before an element does not exclude the existence of a plurality of such element. The present disclosure can be implemented by way of a hardware including several different elements and by way of a computer suitably programmed. In a unit claim enumerating several devices, several of these devices can be specifically implemented by the same hardware. The use of the word "first", "second" and "third", etc. does not represent any sequence. These words can be construed as a name.

Furthermore, it also should be noted that, the expressions used in the specification are principally selected for the purpose of readability and teaching, are not selected for interpreting or limiting the subject of the present disclosure. Therefore, many modifications and alteration are all obvious for those ordinary skilled in the art, without departing from the scope and spirit of the appended claims. For the scope of the present disclosure, the disclosure of the present disclosure is illustrative, not limiting and the scope of the present disclosure is limited by the appended claims.

What is claimed is:

1. A server for preloading a browsed page in a browser, the server comprising:
    one or more non-transitory computer readable medium configured to store computer-executable instruction;
    at least one processor to execute a plurality of software modules configured to execute the computer-executable instruction to cause:
    extracting, from a currently browsed page on a client, links included in the currently browsed page;
    downloading pages corresponding to the links in the currently browsed page from web sites;
    compressing the downloaded pages to generate page compression packages corresponding to the links in the currently browsed page and store the page compression packages into a storage; the storage configured to store the page compression packages corresponding to the links;
    a transceiver configured to on receiving a request transmitted by the client for loading a page of a link in the currently browsed page, transmit the page compression package corresponding to the link in the currently browsed page to be loaded to the client; and
    wherein the processor executes at least one of the software modules configured to execute the computer-executable instruction to cause: taking a page in the page compression package transmitted to the client as the currently browsed page on the client, comparing the links included in the currently browsed page to the links corresponding to the stored page compression packages and updating the page compression packages stored in the storage according to a comparison result.

2. The server according to claim 1, wherein
    the processor executes at least one of the software modules configured to execute the computer-executable instruction to cause:
    for a link which is not included in the currently browsed page, deleting the page compression package corresponding to the link from the storage; for a link which is included in the currently browsed page and of which the corresponding page compression package is not stored, downloading the page corresponding to the link from the website, compressing the downloaded page to generate a page compression package corresponding to the link and storing the page compression package into the storage.

3. The server according to claim 1, wherein
    the processor executes at least one of the software modules configured to execute the computer-executable instruction to cause:
    after receiving the request transmitted by the client for loading an original page, injecting a text loading script into the original page transmitted to the client, the original page being a page browsed when a website is accessed initially;
    for a link corresponding to a keyword in the currently browsed page on the client, extracting a text in the page corresponding to the link, compressing the extracted text to generate a page compression package corresponding to the link which only includes the text, a keyword in the currently browsed page being used for representing an interrelation of texts between pages; and
    the transceiver is configured to receive the request transmitted by the client for loading page of the link corresponding to a keyword, to transmit the page compression package corresponding to the link to the client to make the client add the text in the page compression package into the text of the currently browsed page via the text loading script.

4. The server according to claim 3, wherein the processor executes at least one of the software modules configured to execute the computer-executable instruction to cause:
    injecting a memory release script into the original page transmitted to the client, to make the client judge whether the memory occupied by the currently browsed page exceeds a preset threshold value after receiving the instruction to load the link corresponding to a keyword in the currently browsed page, if yes, release the memory occupied by a text in a previously browsed page.

5. The server according to claim 3, wherein the processor executes at least one of the software modules configured to execute the computer-executable instruction to cause:
    injecting a reading tag function script into the original page transmitted to the client, adding a reading tag function key in the currently browsed page; or,
    injecting a page selection function script into the original page transmitted to the client, adding a selection page function key in the currently browsed page.

6. A client for preloading a browsed page in a browser, the client comprising:
    a transceiver configured to, after receiving an instruction to load a page of a link in the currently browsed page, transmit a request for loading the page of the link in the currently browsed page to a server;
    one or more non-transitory computer readable medium configured to store computer-executable instruction; and
    at least one processor to execute a plurality of software modules configured to execute the computer-executable instruction to cause:
    receiving a page compression package, transmitted by the server and corresponding to the link in the currently browsed page in the instruction; decompressing the page compression package; and loading the page in the page compression package.

7. The client according to claim 6, wherein
    the transceiver is further configured to, after receiving an instruction to load an original web page, transmit a request for loading the original page to the server, the original page being a page browsed when a website is accessed initially; and the processor executes at least one of the software modules configured to execute the computer-executable instruction to cause:

receiving the original page transmitted by the server with an injected text loading script;

loading the original page, and after receiving the page compression package of a link corresponding to a keyword transmitted by the server, adding a text in the page compression package into a text of the currently browsed page via the injected text loading script;

the keyword transmitted by the server is used to represent interrelation of texts between the pages.

8. The client according to claim 7, wherein
the original page is further injected with a memory release script;
the processor executes at least one of the software modules configured to execute the computer-executable instruction to cause:
after receiving the instruction to load a link corresponding to a keyword, judging via the memory release script whether the memory occupied by the currently browsed page exceeds a preset threshold value, if yes, releasing the memory occupied by a text in a previously browsed page.

9. The client according to claim 7, wherein
the original page is further injected with a reading tag function script or a page selection function script,
the processor executes at least one of the software modules configured to execute the computer-executable instruction to cause:
after receiving the original page transmitted by the server, adding a reading tag function key in the currently browsed page via the reading tag function script; or, adding a selection page function key in the currently browsed page via the page selection function script.

10. A method for preloading a browsed page in a browser, the method comprising:
extracting, from a currently browsed page on a client, links included in the currently browsed page;
downloading pages corresponding to the links in the currently browsed page from websites, compressing the downloaded pages to generate page compression packages corresponding to the links and storing the page compression packages;
on receiving a request transmitted by the client for loading a page of a link in the currently browsed page, transmitting the page compression package corresponding to the link in the currently browsed page to be loaded to the client;
taking the page in the page compression package transmitted to the client as the currently browsed page on the client, comparing the links included in the currently browsed page to the links corresponding to the stored page compression packages and updating the stored page compression packages according to a comparison result.

11. The method according to claim 10, wherein
the updating the stored page compression packages according to a comparison result further includes:
for a link which is not included in the currently browsed page, deleting the page compression package corresponding to the link;
for a link which is included in the currently browsed page and of which the corresponding page compression package is not stored, downloading the page corresponding to the link from the website, compressing the downloaded page to generate a page compression package corresponding to the link and storing the page compression package.

12. The method according to claim 10, wherein the method further includes:
after receiving the request transmitted by the client for loading an original page, injecting a text loading script into the original page transmitted to the client, the original page being a page browsed when a website is accessed initially;
the compressing the downloaded pages to generate page compression packages corresponding to the links includes:
for a link corresponding to a keyword in the currently browsed page by the client, extracting a text in the page corresponding to the link and performing compression process to generate a page compression package corresponding to the link which only includes the text, the keyword currently amended being used for representing an interrelation of texts between pages;
the transmitting the page compression package corresponding to the link to be loaded to the client after receiving the request transmitted by the client for loading the link in the currently browsed page includes:
after receiving the request transmitted by the client for loading the link corresponding to a keyword, transmitting the page compression package corresponding to the link to the client, to make the client add the text in the page compression package into the text of the currently browsed page via the text loading script.

13. The method according to claim 12, wherein the method further includes:
injecting a memory release script into the original page transmitted to the client, to make the client judge whether the memory occupied by the currently browsed page exceeds a preset threshold value after receiving the instruction to load the link corresponding to the keyword, if yes, release the memory occupied by a text in a previously browsed page.

14. The method according to claim 12, wherein the method further includes:
injecting a reading tag function script into the original page transmitted to the client, to make the client add a reading tag function key in the currently browsed page; or,
injecting a page selection function script into the original page transmitted to the client, adding a selection page function key in the currently browsed page.

* * * * *